United States Patent [19]
Pang

[11] Patent Number: 6,167,434
[45] Date of Patent: Dec. 26, 2000

[54] COMPUTER CODE FOR REMOVING JUNK E-MAIL MESSAGES

[76] Inventor: Stephen Y. Pang, 300 Murchison Dr., #303, Millbrae, Calif. 94030

[21] Appl. No.: 09/116,690

[22] Filed: Jul. 15, 1998

[51] Int. Cl.[7] .................................................. G06F 15/16
[52] U.S. Cl. ........................... 709/206; 709/207; 709/217
[58] Field of Search .................................. 709/206, 201, 709/205, 207, 228, 217; 345/348

[56] References Cited

U.S. PATENT DOCUMENTS

| | | | |
|---|---|---|---|
| 5,619,648 | 4/1997 | Canale et al. | 709/206 |
| 5,742,769 | 4/1998 | Lee et al. | 709/206 |
| 5,757,669 | 5/1998 | Christie et al. | 709/205 |
| 5,838,923 | 11/1998 | Lee et al. | 709/236 |
| 5,864,684 | 1/1999 | Nielsen | 709/206 |
| 5,905,495 | 5/1999 | Tanaka et al. | 345/335 |
| 5,999,932 | 12/1999 | Paul | 707/10 |

OTHER PUBLICATIONS

Microsoft Mail User's Guide Windows and Presentation Manager Version, 1992.
TWS's eFilter User Manual, TWS, Inc., 1997.

*Primary Examiner*—Zarni Maung
*Attorney, Agent, or Firm*—Townsend and Townsend and Crew LLP

[57] ABSTRACT

A computer program product having a variety of codes. The program is for a computer system including a processor such as a microprocessor, microcontroller, or the like. The system also includes a display, e.g., CRT, flat panel display. A user input device for replying to a SPAM e-mail message sent to e-mail addresses in a SPAM e-mail mailing list also is included. The SPAM mailing list has a user e-mail address. The SPAM e-mail message specifies a reply e-mail address. Among other features, the computer program product includes a computer-readable memory, which has a variety of codes. These include a code that directs the processor to display a reply icon on the display. They also include a code that directs the processor to receive a selection of the reply icon from the user input device. A code that directs the processor to generate an e-mail message addressed to the reply e-mail address also is included. The e-mail message has a remove message indicating a request to remove the user e-mail address from the SPAM e-mail mailing list.

20 Claims, 9 Drawing Sheets

COMPUTER CODE FOR REMOVING JUNK E-MAIL MESSAGES

CROSS REFERENCE TO RELATED APPLICATIONS

The following three commonly-owned co-pending applications, including this one, are being filed concurrently and the other two are hereby incorporated by reference in their entirety for all purposes:

1. U.S. patent application Ser. No. 09/116,691, Stephen Y. F. Pang, entitled, "Method and Device For Removing Junk E-mail Messages,"
2. U.S. patent application Serial No. 09/116,314, Stephen Y. F. Pang, entitled, "System For Removing Junk E-mail Messages,"; and
3. U.S. patent application Ser. No. 09/116,690, Stephen Y. F. Pang, entitled, "Computer Code For Removing Junk E-mail Messages,"

BACKGROUND OF THE INVENTION

The present invention relates generally to telecommunication techniques. More particularly, the present invention provides a novel technique, including computer codes, to remove unwanted e-mail messages from a personal computer, workstation, or the like. These unwanted e-mail messages that were unsolicited are commonly referred to as "SPAM." SPAM includes junk mail or junk e-mail messages, advertisements, adult web site information, and the like.

A variety of techniques have been used to transmit written messages from one geographic location to another. In the early days, people or messengers were the sole means used to carry written information from one person to another person. Although effective and still used today, messengers were limited by their physical abilities. That is, some messengers could not travel over rough terrain such as rocks, jungles, and other landscapes. Large bodies of water were also difficult to cross. Additionally, messengers generally could not travel over long distances in a short period of time. A human messenger could only travel a few miles or tens of miles during a typical day.

Accordingly, messengers were replaced, at least in part, by carrier pigeons. More particularly, carrier pigeons were used to move small pieces of papers having written information thereon from one geographic location to another. Carrier pigeons were quite efficient in some applications but could not generally travel over substantial distances. Accordingly, a relay of ponies and human riders was used for long distance travel across the North American continent. This relay of ponies was called the "Pony Express." The Pony Express carried written communication in the form of mail on leather pouches carried on the relay of ponies across the United States. Although all of these techniques were somewhat effective, they were often costly, unreliable, and difficult to achieve.

In the modern day world, a combination of transportation techniques are used in the postal system. These techniques include, among others, human carriers (e.g., mailmen), motorized vehicles such as cars or trucks, and airplanes, jets, and the like to physically transport mail throughout the United States. Conventional postal systems are often reliable and cost efficient. They are so efficient that they are often subject to many undesirable influences. One of these influences is the routine transmission of unsolicited advertisements, information, and the like to many households across the United States. On any typical day, an average household receives at least one, if not more than one, unsolicited advertisement. As merely an example, the advertisement can be for carpet cleaning, credit cards, and other goods or services that are routinely sent by companies in an attempt to secure a purchase from the household. In many cases, these unsolicited advertisements often burden the postal system. Additionally, households are burdened by the advertisements, which are throw away. These unsolicited advertisements are also termed as "Junk Mail."

Unfortunately, junk mail is not limited to use in only the conventional postal systems. In many wide area computer networking applications, junk mail is commonly sent to users in large groups, often thousands or perhaps millions of users. For instance, a user of a well known wide area network of computers, which is known as the "Internet," often receives numerous lines of junk mail, which has been coined as unsolicited commercial e-mail (UCE) or SPAM! In fact, SPAM refers to such unsolicited advertisements that come to the user by way of electronic mail, also known as "e-mail."

SPAM has become a significant problem degrading Internet performance due to the large number of junk e-mails sent every day, increases the cost to Internet Service Providers and corporations due to the increased need for storage space, decreases the productivity of recipients of e-mails, and the like. Furthermore, the junk e-mail sender pays very little for the ability to clog up the Internet, businesses, and individuals with junk e-mail.

Many distributors of SPAM actually send the SPAM with instructions on how to be removed from the SPAM distribution list. In most cases, however, e-mail messages often do not include such instructions on how to remove a recipient from a junk e-mail distribution list. In the cases where instructions are provided, many drawbacks exist. As merely an example, some of the ways to be removed from the mailing lists is time consuming to the recipient. Additionally, there are simply no standards in being removed from such mailing lists. Furthermore, the techniques that are available to be removed from the junk e-mail distribution list often require the recipient to perform time consuming tasks, such as sending a reply e-mail to the junk e-mail message and specifically typing a request to be removed from the mailing list, forwarding the e-mail message to another e-mail address and typing a request with specified text requesting removal, connecting to a particular web site and following instructions for removal (benefiting the web site provider by providing an advertising "hit"), and the like.

Filters have also been used or proposed to remove junk e-mail messages from a recipients e-mail. In fact, various programs have been developed in an attempt to filter-out junk e-mail messages from in boxes. Such programs appear to focus upon the e-mail address, host source, the format of the message, the content, and the like. When such programs detect junk e-mail, they automatically delete them so the user is not bothered by them. A drawback to such programs is that they may filter-out legitimate bulk e-mail messages that are of interest to the user, for example, e-mail messages from special interest groups, product recall and product warning notices, valuable product promotions from legitimate businesses, upgrade notices and bug patches for software programs, and the like.

From the above, it is seen that an improved technique for permanently removing junk e-mail messages is highly desired.

SUMMARY OF THE INVENTION

According to the present invention, a technique for removing junk e-mail messages from a system of computers over a wide area network is provided in an exemplary embodiment, the present invention provides a technique for easily viewing and removing SPAM without opening it. The technique can permanently remove the SPAM in some embodiments.

In a specific embodiment, the present invention provides a computer program product, but can also be codes. The program is for a computer system including a processor such as a microprocessor, microcontroller, or the like. The system also includes a display, e.g., CRT, flat panel display. A user input device for replying to a SPAM e-mail message sent to e-mail addresses in a SPAM e-mail mailing list also is included. The SPAM mailing list has a user e-mail address. The SPAM e-mail message specifies a reply e-mail address. Among other features, the computer program product includes a computer-readable memory, which has a variety of codes. These include a code that directs the processor to display a reply icon on the display. They also include a code that directs the processor to receive a selection of the reply icon from the user input device. A code that directs the processor to generate an e-mail message addressed to the reply e-mail address also is included. The e-mail message has a remove message indicating a request to remove the user e-mail address from the SPAM e-mail mailing list.

In an alternative embodiment, the present invention provides another computer program product for a computer system. The system has a processor, a display, and a user input device, for requesting removal of a user e-mail address from a SPAM e-mail mailing list in response to a SPAM e-mail. The SPAM e-mail has removal instructions from the SPAM e-mail mailing list. Among other features, the computer program product has a computer-readable memory with a variety of codes. These include a code that directs the processor to display a remove icon on the display. They also include a code that directs the processor to receive a selection of the remove icon from the user input device. Additionally, a code that directs the processor to determine removal actions in response to the removal instructions is included. A code that directs the processor to perform the removal actions also is included. Among other codes, all of the techniques described herein can be implemented, at least in part, by computer codes.

Numerous advantages are achieved by way of the present invention over conventional techniques. As merely an example, the present invention provides an easy to use method to remove unwanted or unsolicited e-mail messages. In some embodiments, the present invention is relatively easy to implement using pre-existing computer software. The present invention also is time efficient and relatively cost efficient. The computer codes also allows a user to permanently remove unwanted e-mail messages from a distribution list. Depending upon the embodiment, one or more of the advantages are achieved. These and other advantages are described throughout the present specification, and more particularly below.

These and other embodiments of the present invention, as well as its advantages and features are described in more detail in conjunction with the text below and attached

DESCRIPTION OF SPECIFIC EMBODIMENTS

I. SYSTEM HARDWARE

Figure 1:
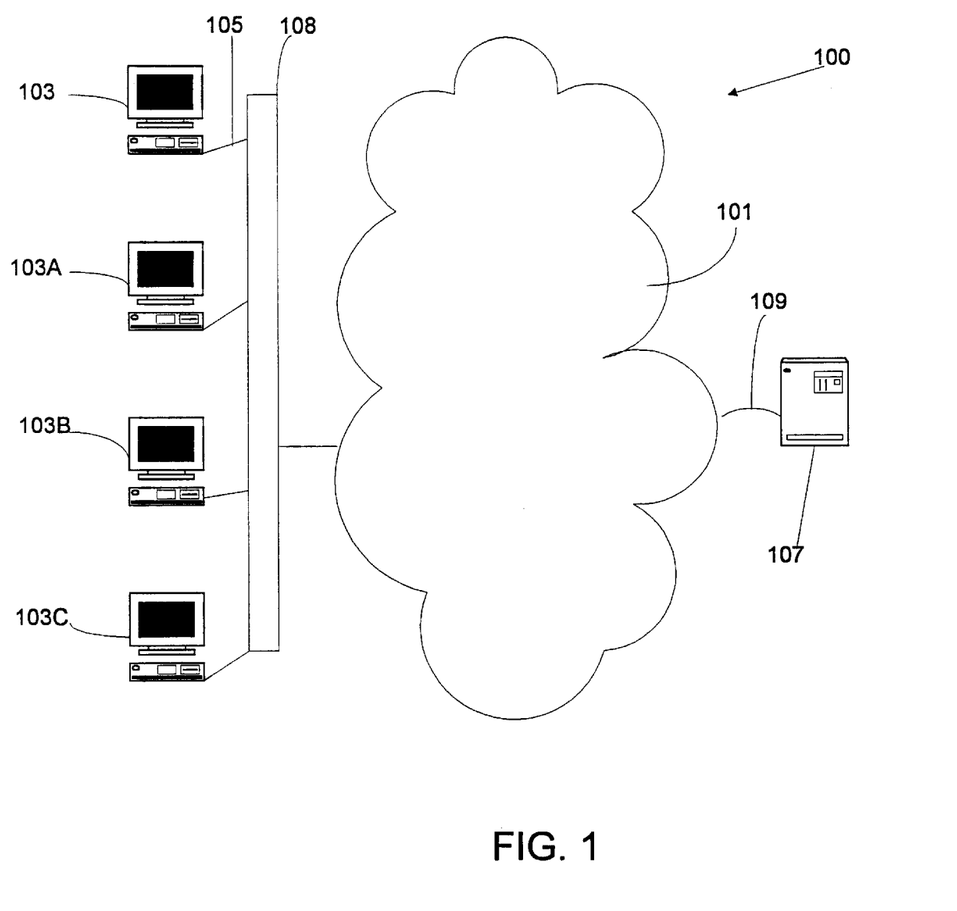
FIG. 1 is a simplified block diagram of an e-mail system according to an embodiment of the present invention.

FIG. 1 is a simplified block diagram of an e-mail system 100 according to an embodiment of the present invention. This diagram is merely an illustration and should not limit the scope of the claims herein. One of ordinary skill in the art would recognize other variations, modifications, and alternatives. Among other features, the system 100 is a wide area network of computers such as, for example, the Internet. The network of computers includes workstations or computer terminals 103, which can be IBM compatible personal computers (i.e., PCs), workstations, network computers (i.e., NCs), remote computing devices, television sets, or other computer-like devices. These computers typically are coupled through lines 105 via server 108 to the Internet 101, which includes a variety of servers and other computers. As merely an example, one of the servers is shown as server 107.

Server 107 can be any suitable server that distributes unsolicited advertisements such as junk mail. Server 107 is coupled to the Internet through line 109, which can be through an Internet service provider, which is commonly known as an ISP. Server 107 often includes sufficient memory to store information such as advertisements and the like. The memory can also store an e-mail distribution list. The memory can be based on a hard drive, a floppy drive, tape, or other storage media. Of course, the type of memory used depends upon the application.

The e-mail distribution list can include e-mail addresses to one of a plurality of computers 103A, 103B, 103C, and 103D, which can correspond to users. The e-mail distribution list is often compiled from other e-mail distribution lists that are often accumulated from other servers or even purchased. The e-mail distribution list can also be formed by adding the e-mail addresses of users of selected sites. E-mail distribution lists can often range in hundreds, thousands, or even millions of users. As merely an example, a typical e-mail distribution list is often about thousands or even millions of e-mail names and greater. Of course, the type of e-mail distribution list depends upon the application.

Each of these computers can be at a user site such as a home, corporate address, or remote location. Periodically, each of these computers receives an unsolicited e-mail message such as an advertisement from server 107 or a plurality of servers. Literally hundreds, thousands, or even millions of unsolicited e-mail messages can be sent to one or more of the computers by way of the Internet from one or more servers. Given the efficiency of the e-mail system of the Internet, the user of the computer can receive many e-mail messages from a large number of servers. These servers can send desirable advertisements as well as many undesirable advertisements. As merely an example, the advertisement can be for a car, a book, or other consumer products. Additionally, the advertisement can be for "sensitive material" such as an adult Web Site or other materials. The present invention provides a technique to remove these unwanted e-mail messages in an efficient way. Before discussing details of the present invention, details of a computer according to the present invention are shown by way of the FIG. below.

Figure 2:
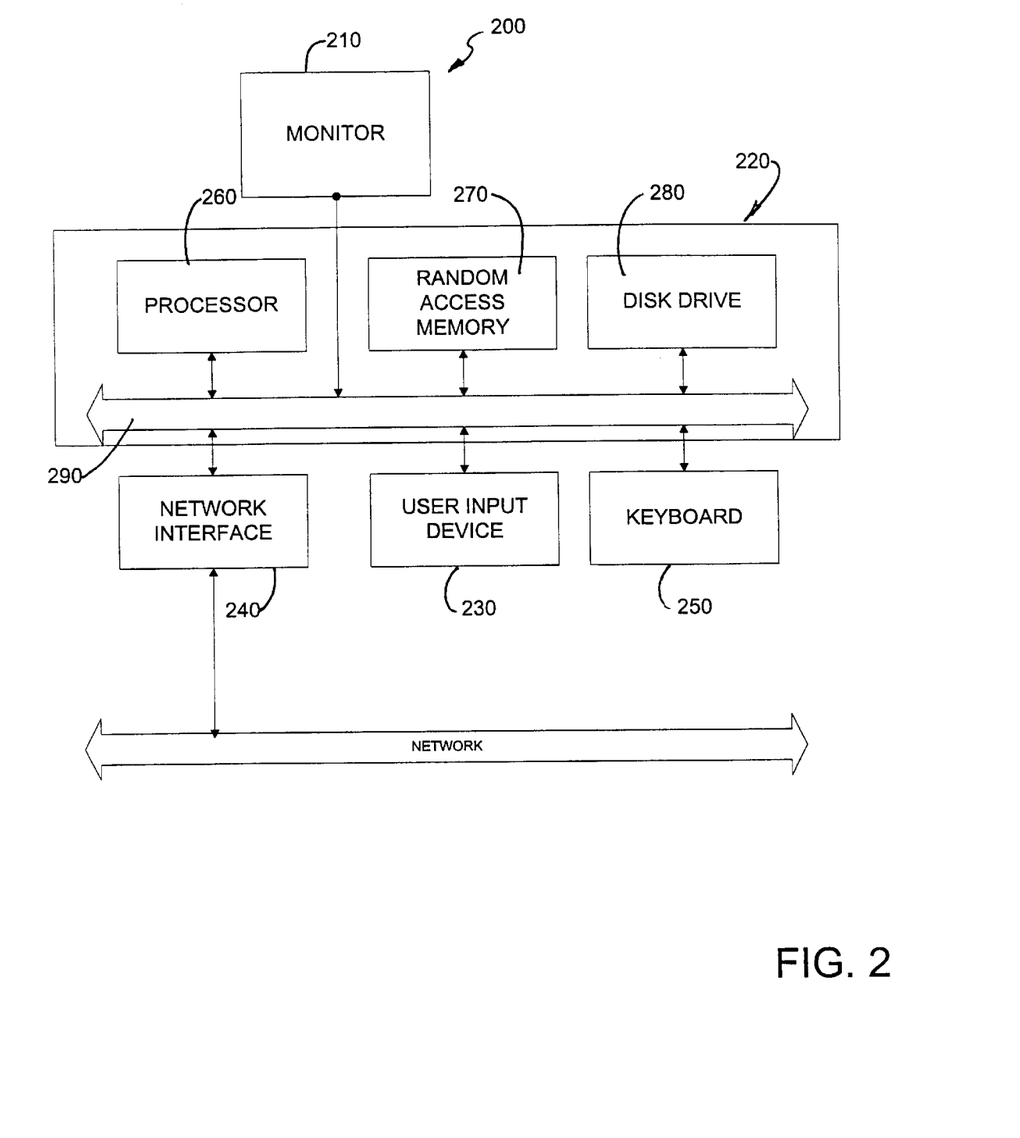
FIG. 2 is a simplified block diagram of a display according to an embodiment of the present invention.

FIG. 2 is a simplified block diagram of a system 200, according to an embodiment of the present invention. This diagram is merely an illustration and should not limit the scope of the claims herein. The system 200 includes a monitor 210, a computing system 220, a user input device 230, a network interface 240, and a keyboard 250. Computing system 220 preferably includes familiar components such as a processor 260, and memory storage devices, such as a random access memory (RAM) 270, a fixed disk drive 280, and a system bus 290 interconnecting the above components. User input device 230 may include a mouse, a trackball, a keyboard, a keypad, a joystick, a digitizing tablet, a wireless controller, a microphone, or other input devices.

RAM 270 and fixed disk drive 280 are mere examples of tangible media for storage of computer programs, e-mail messages, audio and/or video data, e-mail client programs, and code implementing embodiments of the present invention. Other types of tangible media include SRAM, floppy disks, optical storage media such as CD-ROMs and bar codes, semiconductor memories such as flash memories, read-only-memories (ROMs), ASICs, battery-backed volatile memories, and the like.

Network interface 240 may be any type of interface to a computer network. For example network interface 240 may be a modem, an Ethernet or fast Ethernet interface, a LocalTalk connection, a satellite or other wireless connection, or the like. As disclosed above, the computer network may be any type of network such as the Internet, an Intranet, an IPX network, private tunnel, local area network (LAN), WAN, and the like.

In a preferred embodiment, computing system 220 includes a '586 class microprocessor running Windows98™ operating system from Microsoft Corporation of Redmond, Wash. The embodiment typically includes an electronic mail (e-mail) client application, such as Netscape Messenger, Novell GroupWise, Qualcomm Eudora, Microsoft Outlook or Exchange, Lotus Domino, Pegasus Mail, or another typical e-mail program or groupware for reading and managing e-mail.

Many other computer systems, such as MacOS™ from Apple Corporation, running upon G3 based microprocessors, or Solaris™ from Sun Microsystems or UNIX running upon a SPARCstation, and the like can also be used.

The system above discloses examples of configurations that embody the present invention. It will be readily apparent to one of ordinary skill in the art that many system types, configurations, and combinations of the above devices are suitable for use in light of the present disclosure. Of course, the types of system elements used depend highly upon the application.

In one embodiment of the present invention, a text parsing routine can be implemented. In such an embodiment, the text parsing routine automatically parses the junk e-mail message and determines the specified method for removal from the mailing list. For example, the text parsing routine can determine that a junk e-mail message should be "replied to" with the text "remove", "unsubscribe", or the like in the subject line, in the body of the e-mail message, and the like. As another example, the text parsing routine can determine that a junk e-mail message should be forwarded to a specified e-mail address, again with special text such as "delete", "please remove", and the like included therein. As merely another example, the routine can determine that a specific web site should be contacted using a web browser and specific acts performed such as clicking on a button on the web site. Other types of actions are contemplated in alternative embodiments of the present invention and can depend upon the type of removal instructions specified by the junk e-mail message.

In one embodiment, when the user clicks upon the remove icon, the junk e-mail message is not only replied to using the user's e-mail program, but is also deleted or purged from the user's in box. Thus with a single click of the remove icon, a request for removal from the e-mail mailing list is generated and the message is deleted. In some embodiments, the e-mail message is transferred to trash.

In another embodiment, when a junk e-mail has been removed by selecting the remove command or by clicking on the remove icon, a log is maintained of the incoming junk e-mail message, the source of the junk e-mail message, the product advertised in the e-mail message, or the like. Further, a log is maintained as to when the reply e-mail, to whom the reply e-mail is sent to, actions taken, or the like. Such logs are valuable as to tracking junk e-mails and to demonstrate whether the requests for removal have been respected. If a junk e-mail source repeatedly ignores removal requests, the logs may provide grounds for ISPs to terminate junk e-mail sender's accounts, may provide evidence to governmental authorities, and the like.

In light of the disclosed embodiments, enhancements to the present invention include that icons can be provided to reply in other ways to e-mail messages in general. For example, in office environments, commonly meetings are scheduled by e-mail. Such e-mail messages often request recipients of the message to reply to the message or to send an e-mail message to a third party so there can be a head count for seating, purposes, for providing the correct amount of refreshments, for printing the enough meeting materials, and the like. Such e-mail messages require the user to perform time consuming tasks such as determining who a reply e-mail message must be sent to, typing in a message, calling a person by telephone, and the like. In this example, a standardized method for replying to such meeting invitations can be accomplished by providing an confirm icon, on the users' e-mail system. In such an embodiment, when the user sees such a request, by simply clicking upon the confirm icon, the user confirms their attendance.

In light of the disclosed embodiments, enhancements to the present invention are envisioned. For example, it is envisioned that users will be able to define custom actions and assign such actions to custom icons for display on the e-mail system. Some examples of custom user interfaces are shown below.

II. USER INTERFACES

Figure 3:
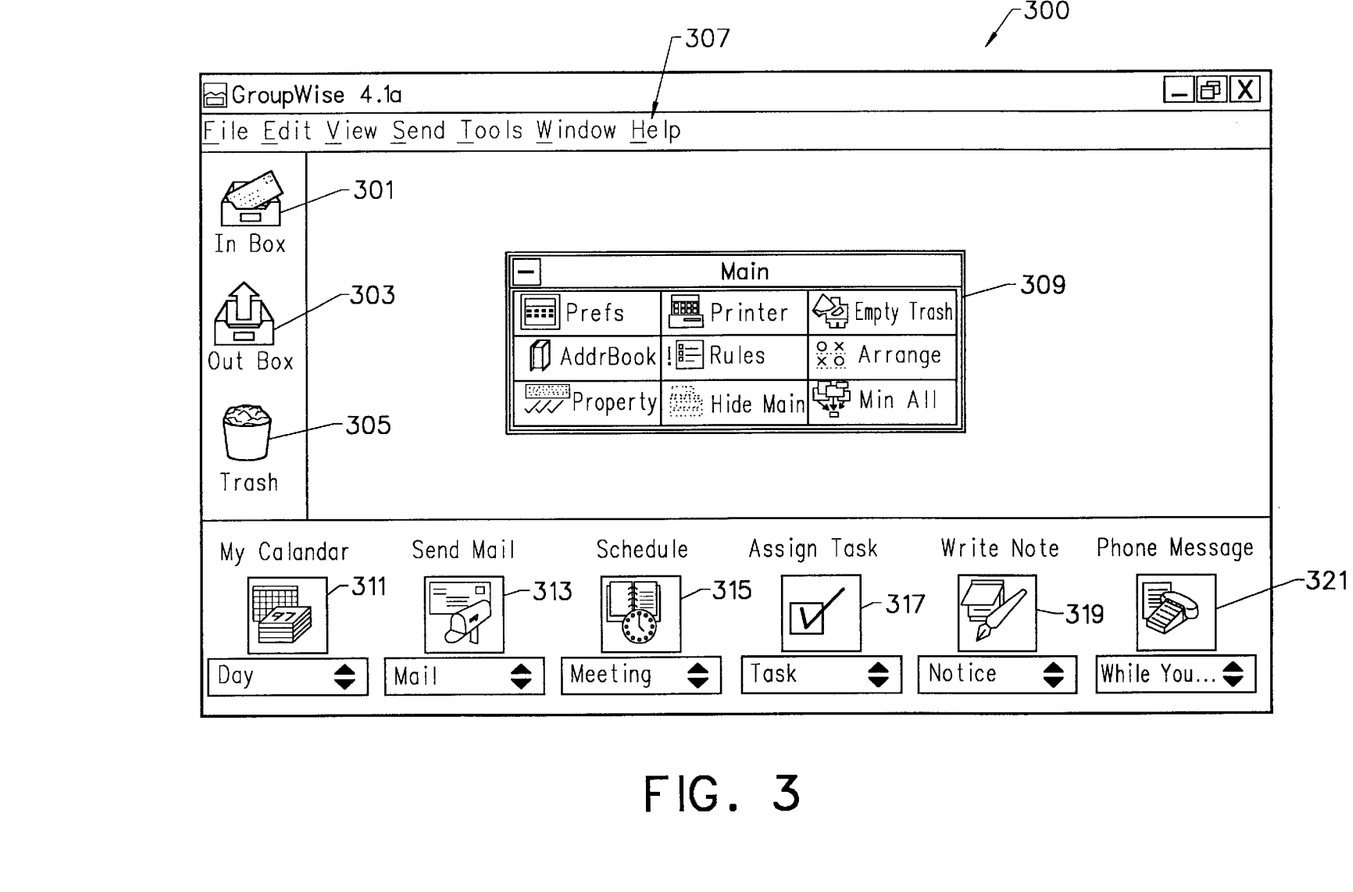
FIGS. 3–5 are simplified user interfaces according to embodiments of the present invention.
Figure 4:
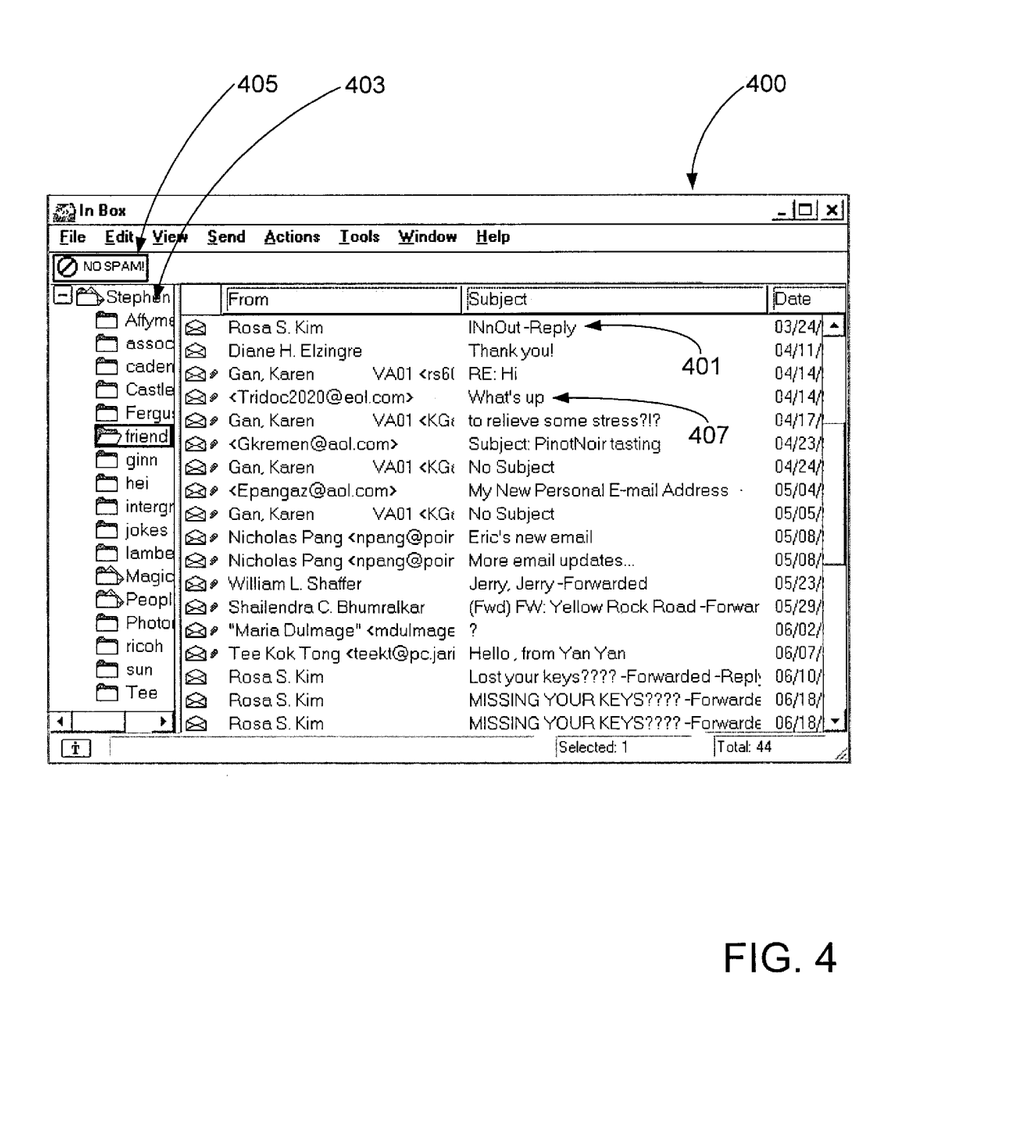
Figure 5:
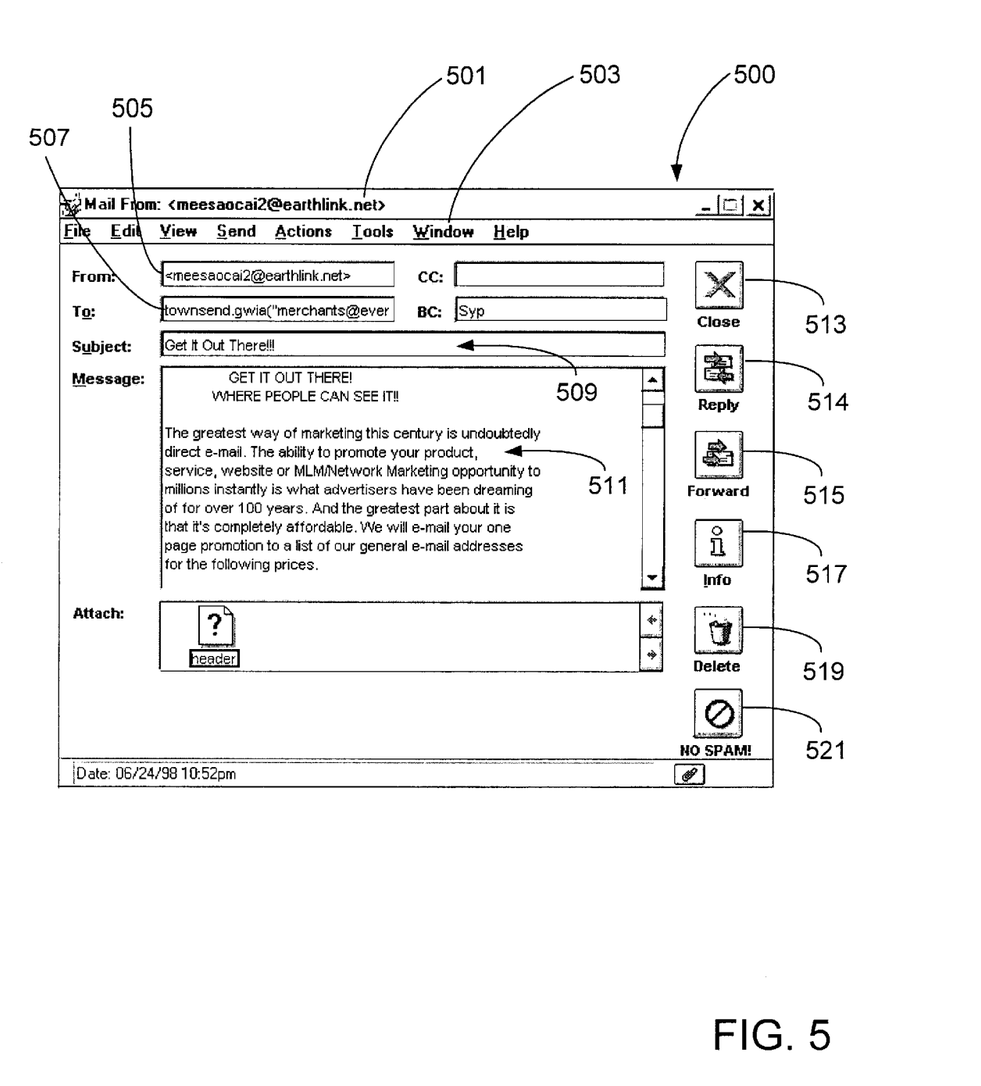

FIGS. 3–5 are simplified user interfaces according to embodiments of the present invention. These diagrams are merely illustrations and should not limit the scope of the claims herein. One of ordinary skill in the art would recognize other variations, modifications, and alternatives. As merely an example, FIG. 3 shows a graphical user interface 300 for an e-mail system according to an embodiment of the present invention. The graphical user interface 300 is one of many, if not the first, window for the e-mail system. The user interface includes a variety of features such as a tool bar 307 that has at least features directed to File, Edit, View, Send, Tools, Window, and Help prompts. Additionally, the interface includes an in-box 301, an out-box 303, and a trash can 305. As shown, the in-box, out-box, and trash can be accessed by way of a mouse cursor positioned over a respective icon which allows entry.

The e-mail also has a main menu 309, and a lower group of icons for accessing a calender 311, a send mail program 313, a schedule program 315, a task program 317, a note program 319, and a phone message program 321 that are typically provided in "groupware" applications. Details of these particular features can be found in one of many conventional e-mail systems such as, for example, Group-Wise by Novell as well as other e-mail systems.

The present invention allows for easy viewing and removal of junk e-mail messages or SPAM by first entering the in-box 301. The in-box is entered by clicking a cursor by way of a mouse onto the in-box icon. Once the in-box is accessed, a graphical user interface such as the one 400 shown in FIG. 4 is displayed. The in-box user interface includes a variety of elements such as a root directory 403, which is in the name of "Stephen" for example. The root directory includes a variety of sub-directories such as "friend" for example. As shown, the friend directory is highlighted by way of an outline. The friend directory is also open, as shown by the opened file folder. The friend directory receives a variety of e-mail messages which are sent to the main directory or directly to the friend directory. As shown, the e-mail messages come from "real" friends of the user or receiver such as the names listed, including Shailendra C. Bhumralkar, William L. Shaffer, and others. Additionally, the friend directory includes junk mail, non-solicited mail, or SPAM, as shown by the line item corresponding to "What's up" 407, which is from Tridoc2020@eol.com. The SPAM has not been opened but can be easily identified by the user by the unknown e-mail name and message.

In the present embodiment, the user can remove the SPAM by simply clicking on the "NO SPAM!" icon 405, which is disposed around the periphery of the graphical user interface. The periphery of the graphical user space is outside of the region for the main text or body of the e-mail message.

In some embodiments, the periphery of the graphical user interface is a portion of a tool bar, for example, which is easy to access but substantially out of the way of the text. Here, the icon is displayed simultaneously with the many lines of e-mail messages, including titles and senders. Activation of the NO SPAM button removes the e-mail message or disposes the e-mail message into the trash.

Activation of the NO SPAM button also sends a reply to the sender, which is Tridoc2020@eol.com. The reply sends a message such as a "remove" term which indicates that the receiver of the SPAM or Stephen in the present example would like to be removed from the distribution list from the SPAM server. By way of the present user interface, the SPAM is removed without even opening it. The present user interface is easy to use, by way of a simple position and click, and permanently removes the receivers name from the SPAM distribution list. Accordingly, the receiver will not receive SPAM from the SPAM mailing list of Tridoc2020@eol.com, as long as the user's name is permanently removed from the distribution list.

In an alternative embodiment, the receiver of SPAM reads the SPAM message before removing it by way of a novel graphical user interface 500 or window shown in FIG. 5. This graphical user interface includes a variety of features such as a tool bar 503, sender field 505, receiver field 507, subject line 509, and e-mail message 511, which is SPAM. The interface also includes icons for closing the window 513, replying to the sender 514, forwarding the e-mail 515, information 517, deleting the e-mail 519, and others. The interface also includes an icon labeled "NO SPAM!" for permanently removing the SPAM.

The NO SPAM! button removes the e-mail message or disposes the e-mail message into the trash. The NO SPAM! button also sends a reply to the sender, which is meesaocai2@earthlink.net 501. The reply sends a message such as a remove term which indicates that the receiver of the SPAM or Stephen would like to be removed from the distribution list from the SPAM server using meesaocai2@earthlink.net. By way of the present user interface, the SPAM is removed after opening it. The present user interface is easy to use, by way of a simple position and click, and permanently removes the receivers name from the SPAM distribution list. Accordingly, the receiver will not receive SPAM from the SPAM mailing list of meesaocai2@earthlink.net 501, if the SPAM server permanently removes the receives name from the distribution list.

Although the above embodiments are shown by way of specific user interfaces, the present invention is much broader. In particular, the present invention can be applied to other e-mail systems and other types of interfaces. The invention can also be added to pre-existing systems without significant limitations or the like. The invention is shown, in part, by the SPAM! icon, but is not limited. The present invention merely provides an easy to use technique for removing SPAM and the user's name of an e-mail distribution list of a SPAM server. Details with regard to specific methods according to embodiments of the present invention are shown below.

III. PRESENT METHODS

Figure 6:
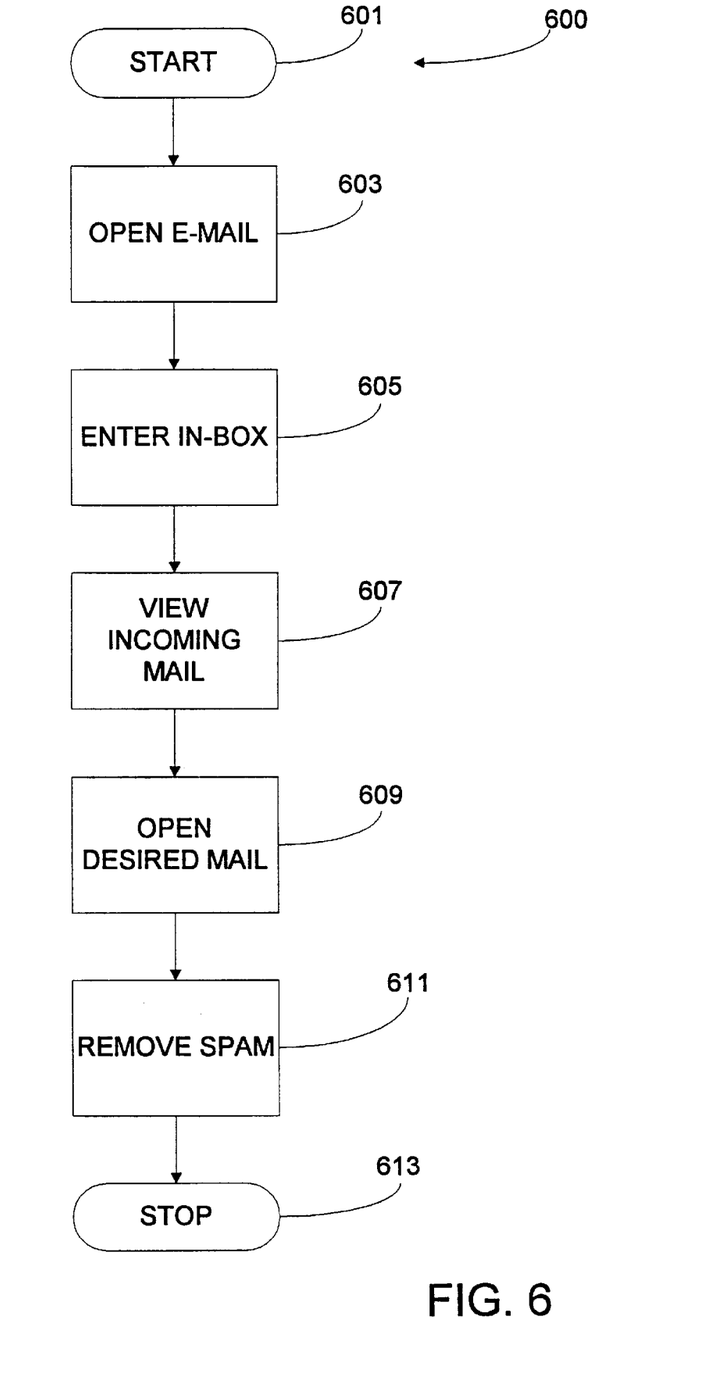
FIGS. 6–9 are simplified flow diagrams according to embodiments of the present invention.

FIGS. 6–9 are simplified flow diagrams according to embodiments of the present invention. These diagrams are merely illustrations and should not limit the scope of the claims herein. One of ordinary skill in the art would recognize other variations, modifications, and alternatives. In an embodiment, the process 600 begins with start 601, as shown in FIG. 6. Among other processes, a user of the computer may perform a variety of operations. These operations include word processing, spread sheets, and others. The user also checks his/or e-mail by opening e-mail (step 603). The user selects one of many functions that are available on e-mail.

In some embodiments, the e-mail has an in-box and an out-box. In a preferred embodiment, the user opens or enters the in-box, step 605. In particular, the user positions a cursor over an icon and clicks on the icon. The icon opens the in-box. Alternatively, the user uses a "hot key" to open the in-box. Other techniques can also be used to open the in-box.

Once the in-box is opened. The user views the pending e-mails. In most embodiments, the user views (step 607) lines of e-mails that have been sent to the user e-mail address. The lines of e-mail contain both legitimate e-mail messages from friends, family, and business. Other e-mail messages include unsolicited advertisements, junk mail, and the like, which are referred herein as SPAM. The user opens desired e-mail messages (step 609) and removes them based upon title, for example. The user can delete the desired e-mail messages, archive the messages, forward the messages, reply to the messages, or perform other functions.

In a preferred embodiment, a line item of SPAM is removed (step 611) before opening it. In a specific embodiment, the SPAM is removed. Depending upon the embodiment, the SPAM can be removed by way of a variety of ways. The process ends at step 613, which is STOP.

Figure 7:
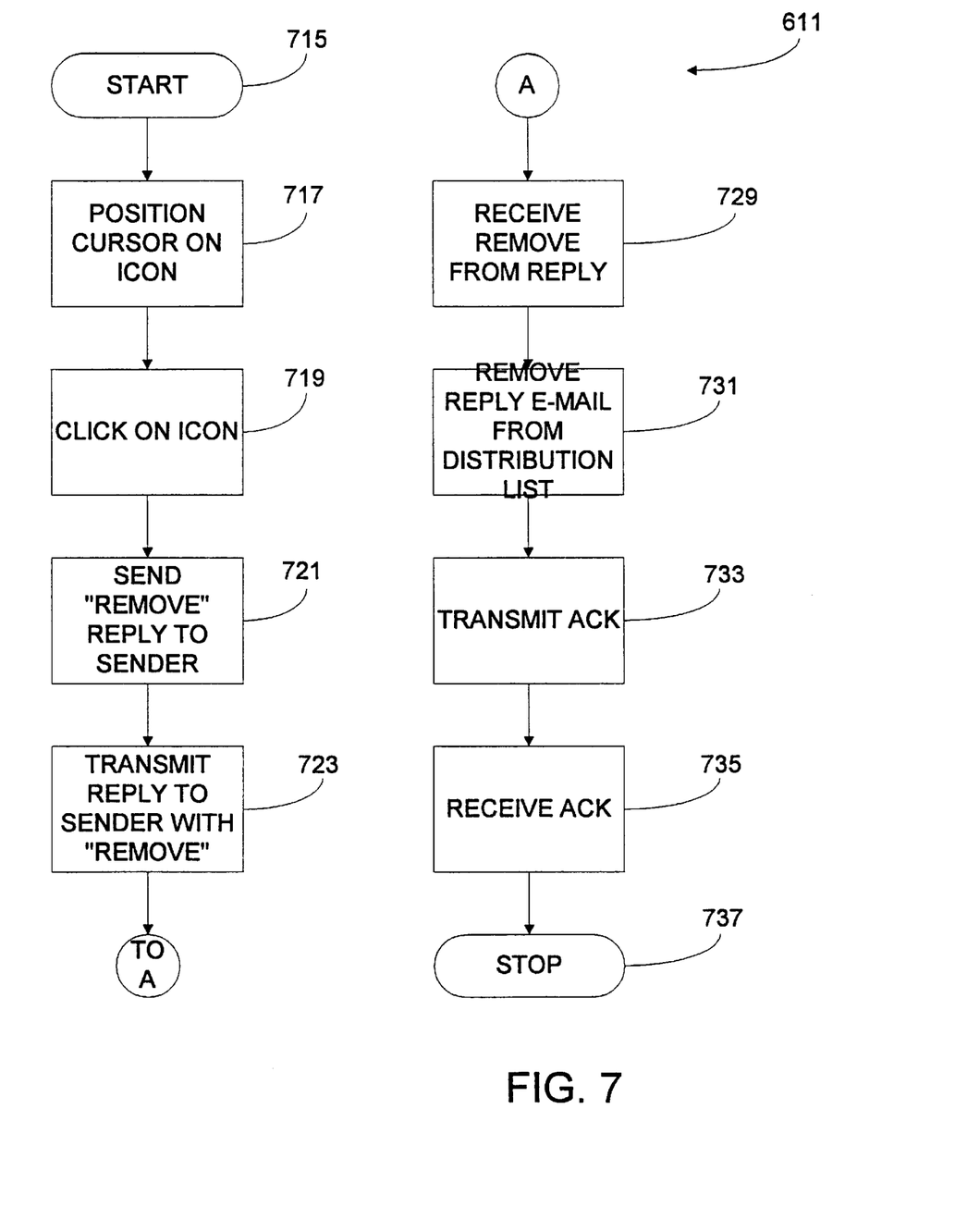

In a specific embodiment, the present invention provides a process for removing SPAM, as shown by the flow diagram 611 of FIG. 7. The user positions a cursor in front of an icon 717, which can be a SPAM icon or the like such as the ones shown above. The user clicks onto the icon (step 719), which begins a process to remove the SPAM as well as remove the user's name from an e-mail distribution list, as well as other functions. In particular, the process sends (step 721) a prompt such as a "remove" text in the form of a reply to the sender or distributor of e-mail.

The Remove is transmitted (step 723) to the sender via the wide area network of computers or Internet. By way of the present process, the user can click onto an icon to remove the SPAM and send a Remove reply to the sender to permanently remove the name of the user from a junk mail e-mail distribution list.

In alternative embodiments of the present invention, a text parsing routine can be used to automatically determine the type of actions required to request removal from an e-mail distribution list. For example, the routine may determine that the "remove" text should be located in the body of the e-mail and not the subject line; the routine may determine that the "remove" request should be e-mailed to another e-mail address and not the reply address; the routine may determine that the "remove" request should be forwarded with a request to a different e-mail address; and the like. In sum, the parsing routine can determine the appropriate removal technique specified by the junk e-mail message.

In the present embodiment, sender receives the Remove reply message (step 729) via the wide area network of computers or Internet. The sender generally receives such Remove reply via e-mail message or other technique. The sender then removes (step 731) the name of the user from the e-mail distribution list or the like from memory in a server, for example. This occurs manually or automatically according to a specific process.

Once the user name is removed, an acknowledgment message (step 733) can be sent to the user by way of e-mail. The e-mail message traverses through the wide area network of computers or Internet and ends up in the users e-mail box. Here, the user receives (step 735) the acknowledgment which can be a "ACKNOWLEDGE Remove" language or other information. The present process then stops, step 737.

In alternative embodiments of the present invention, acknowledgment need not be provided by the junk e-mail sender.

Figure 8:
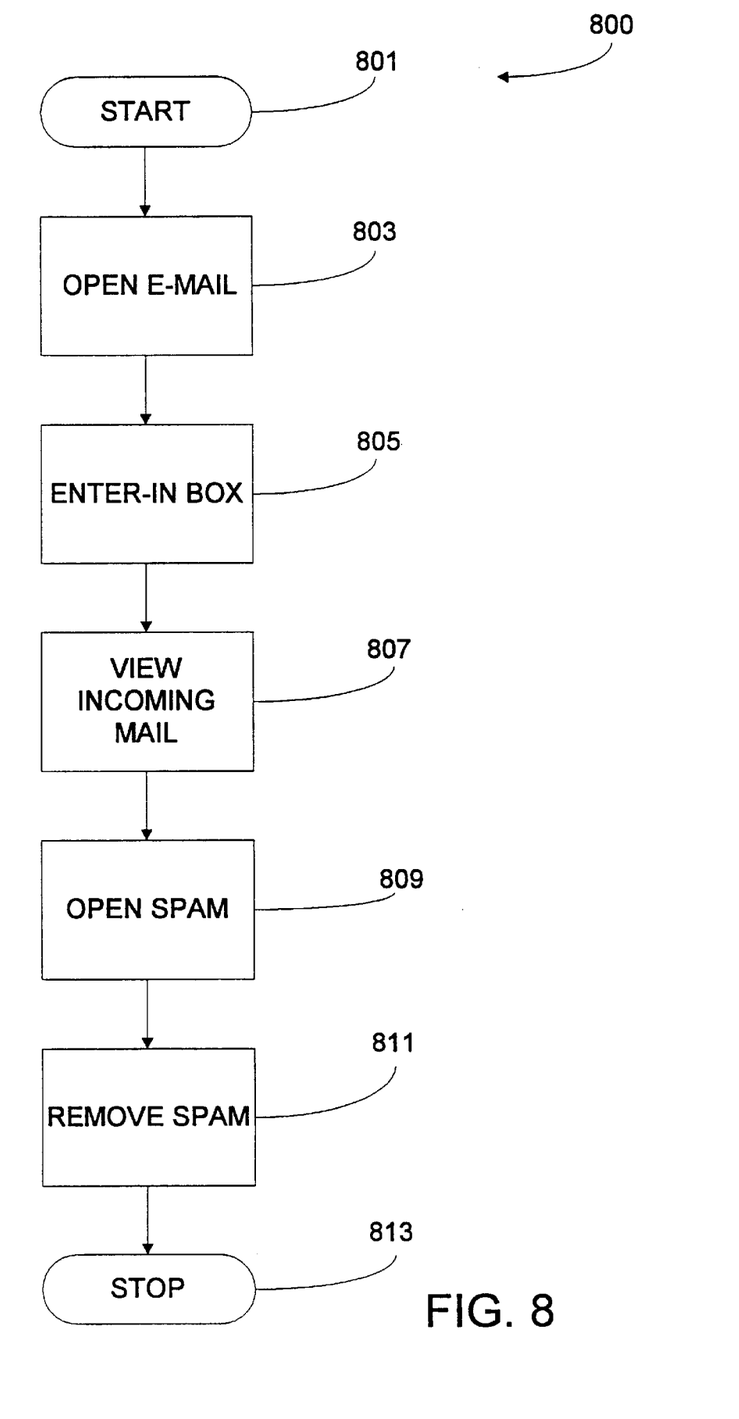

An alternative embodiment is shown by FIG. 8. The process begins with start 801, as shown in FIG. 8. Among other processes, a user of the computer may perform a variety of operations. These operations include word processing, spread sheets, and others. The user also checks his/or her e-mail by opening an e-mail client program (step 803).

The user selects one of many functions that are available from the e-mail client program. In some embodiments, the e-mail has an in-box and an out-box. In a preferred embodiment, the user opens a window on the display to show the contents of the in-box, step 805. In particular, the user positions a cursor over an icon according to an embodiment of the present invention and clicks on the icon. The icon opens the in-box. Alternatively, the user uses a "hot key" to open the in-box. Other techniques can also be used to open the in-box.

Once the in-box is opened. The user views the pending e-mails. In most embodiments, the user views (step 807) the subject lines of e-mails that have been sent to the user e-mail address. The lines of e-mail contain both legitimate e-mail messages from friends, family, and business. Other e-mail messages include unsolicited advertisements, junk mail, and the like, which are called SPAM. The user opens desired e-mail messages and then reads the content. The user can delete the desired e-mail messages, archive the messages, forward the messages, reply to the messages, or perform other functions.

In this embodiment, the user also opens unsolicited commercial e-mail message (step 809). Here, the user can read the message and determine if it is desirable to keep or get off the junk e-mail message mailing list. Often, the e-mail recipient is a household or a corporation, and the like finds that the SPAM is an adult Web Site a ge-trich-quick scheme, or other undesirable e-mail. In the case the recipient determines that the e-mail message is junk or SPAM, it is "removed" (step 811). Depending upon the embodiment, the SPAM can be removed by way of a variety of ways, as will be described below. The process ends at step 813, which is STOP.

Figure 9:
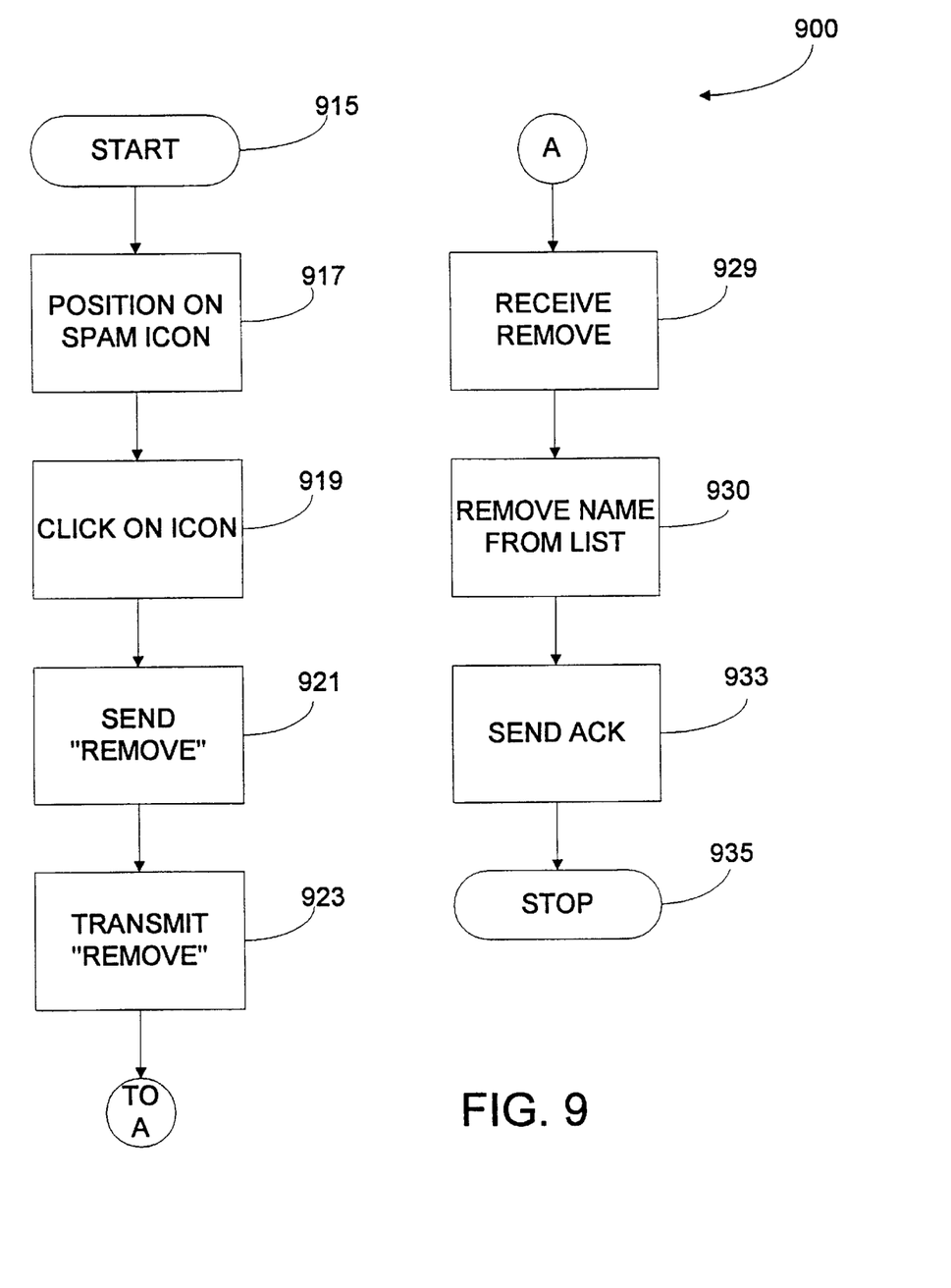

In a specific embodiment, the present invention provides a process for "removing" SPAM, as shown by the flow diagram 900 of FIG. 9. The process begins with start, step 915. The user positions a cursor in front of a "remove" icon 917 on the display, for example, icon 521 in FIG. 5, which can be a SPAM icon or the like such as the ones described herein, but can be others. The user selects the icon (step 919), which begins a process to remove the SPAM from the recipient's e-mail in-box, requests removal of the user's name from an e-mail distribution list, as well as perform other functions.

In particular, the process sends (step 921) a reply e-mail message with a "remove" text in the subject line, or body of the e-mail. The remove request is transmitted (step 923) to the sender via the wide area network of computers or Internet. By way of the present process, the user can click onto an icon to remove the SPAM from the user's in-box and send a remove reply to the sender to request permanent removal of the recipient's name from a junk mail e-mail distribution list.

In alternative embodiments of the present invention, a text parsing routine can be used to automatically determine the type of actions required to request removal from an e-mail distribution list. For example, the routine may determine that the "remove" text be located in the body of the e-mail and not the subject line; the routine may determine that the "remove" request should be e-mailed to another e-mail address and the reply address; the routine may determine that the "remove" request should be forwarded with a request to a different e-mail address; and the like. Thus in one embodiment of the present invention, the routine determines the method for requesting removal from the junk e-mail distribution list.

In the present embodiment, the sender receives the remove reply message (step 929) via the wide area network of computers or Internet. The sender generally receives such remove reply via e-mail message or other technique. The sender then removes (step 930) the name of the user from the e-mail distribution list or the like from memory of a server, for example. This occurs manually or automatically according to a specific process.

Once the user name is removed, an acknowledgment or confirmation message (step 933) can be sent to the user by way of e-mail. The e-mail message traverses through the wide area network of computers or Internet and ends up in the users e-mail box. The present process then stops, step 935. In alternative embodiments, acknowledgment or removal from a junk e-mail mailing list need not be performed.

The present methods can be implemented in computer codes, where the codes can be separated or combined with others. Additionally the methods can be in the form of computer software and/or hardware. The software can be separated or combined. Additionally, the software can be combined with hardware, which can be combined or separated. As merely an example, the present invention can use, for example, computer code in the form of macros from an e-mail program such as GroupWise, for example. The macros can be shown below.

Application (A1; "WPOffice "; Default; "US")
ItemReply (ReplyTo: Sender!; IncludeText: No!)
FocusSet (Place: Subject!)
DeleteWordRight ()
Type (Text: "REMOVE")
ItemSend ()
ItemDeleteOpenItem ()

The codes shown above are merely examples and should not limit the scope of the claims herein. One of ordinary skill in the art would recognize other variations, modifications, and alternatives.

Although the above invention has been described using a specific sequence of steps. It would be recognized that other variations can exist. For example, the sequence of steps can be changed in order. Additionally, a step in the sequence of steps can be removed. Alternatively, steps in the sequence can be combined. Furthermore, an additional step or steps can be inserted. These and other combinations will be apparent to those of ordinary skill in the art.

While the above is a full description of the specific embodiments, various modifications, alternative constructions and equivalents may be used.

Therefore, the above description and illustrations should not be taken as limiting the scope of the present invention which is defined by the appended claims.

What is claimed is:

1. A computer program product for a computer system including a processor, a display, and a user input device, for replying to a spam e-mail message sent to e-mail addresses in a spam e-mail mailing list, including a user e-mail address, the spam e-mail message specifying a reply e-mail address, the computer program product comprising:

a computer-readable memory comprising
code that directs the processor to display an e-mail client graphical user interface including a reply icon on the display;
code that directs the processor to receive a selection of the reply icon from the user input device, the selection comprising clicking upon the reply icon on the e-mail client graphical user interface on the display;
code that directs the processor to automatically generate an e-mail message addressed to the reply e-mail address in response to the selection of the reply icon, the e-mail message including a predetermined message indicating a request to remove the user e-mail address from the spam e-mail mailing list, the predetermined message comprising a remove message;
code that directs the processor to automatically send the e-mail message to the reply e-mail address via an e-mail client in response to the selection of the reply icon; and
code that directs the processor to indicate in a log file that the e-mail message has been automatically sent.

2. The computer program product of claim 1 wherein the code that directs the processor to generate the e-mail message includes code that directs the processor to include the remove message on a subject line of the e-mail message.

3. The computer program product of claim 1 wherein the code that directs the processor to generate the e-mail message includes code that directs the processor to include the remove message in a body of the e-mail message.

4. The computer program product of claim 3 wherein the remove message is selected from the class: remove, un-subscribe.

5. The computer program product of claim 1 wherein the code that directs the processor to generate the e-mail message includes code that directs the processor to determine the reply e-mail address in response to the spam e-mail message.

6. The computer program product of claim 1 wherein the code that directs the processor to generate the e-mail message includes code that directs the processor to determine the remove message in response to the spam e-mail message.

7. The computer program product of claim 1 wherein the e-mail client graphical user interface is adapted to display e-mail messages delivered via the Internet.

8. The computer program product of claim 1 wherein the computer-readable memory also comprises:
code that directs the processor to maintain a log of spam e-mail messages.

9. The computer program product of claim 8 wherein the computer-readable memory also comprises code that directs the processor to maintain a log of spam e-mail messages replied to.

10. A computer program product for a computer system including a processor, a display, and a user input device, for requesting removal of a user e-mail address from a spam e-mail mailing list in response to a spam e-mail, the spam e-mail including removal instructions from the spam e-mail mailing list, the computer program product comprising:

a computer-readable memory comprising:
code that directs the processor to display a remove icon on the display;
code that directs the processor to receive a selection of the remove icon from the user input device, the selection comprising clicking upon the remove icon on the display;
code that directs the processor to automatically determine removal actions in response to the removal instructions from the spam e-mail, and in response to the selection of the remove icon; and
code that directs the processor to automatically perform the removal actions in response to the selection of the remove icon.

11. The computer program product of claim 10 wherein the code that directs the processor to determine the removal actions comprises code that parses the spam e-mail to determine the removal instructions.

12. The computer program product of claim 10 wherein the removal actions comprise sending a reply e-mail to the spam e-mail requesting removal from the spam e-mail mailing list.

13. The computer program product of claim 10
wherein the spam e-mail also includes another e-mail address; and
wherein the removal actions comprise forwarding the spam e-mail to the other e-mail address including a request for removal from the spam e-mail mailing list.

14. The computer program product of claim 10
wherein the spam e-mail also includes a web address; and
wherein the removal actions comprise connecting to the web address.

15. The computer program product of claim 10 wherein the code that directs the processor to automatically perform the removal actions comprises:

code that directs the processor to use an Internet browser to connect to a web site specified by the spam e-mail in response to the removal actions; and code that directs the processor to select an action button specified by the spam e-mail located at the web site.

16. The computer program product of claim 10 wherein the user input device is a mouse and clicking upon the remove icon on the display comprises a click of a button on the mouse.

17. The computer program product of claim 10 wherein the user input device is a microphone.

18. An e-mail client program product for a computer system coupled to an e-mail server, the server for providing e-mail messages, the computer system including processor, a display, and a user input device, the computer program product comprising:

code that directs the processor to receive an e-mail message via the Internet;

code that directs the processor to display a graphical user interface including e-mail in-box interface and a user-selectable icon on the display, the e-mail in-box interface including at least a portion of the e-mail message;

code that directs the processor to receive a selection of the portion of the e-mail message on the display via the user input device;

code that directs the processor to receive a selection of the user-selectable icon on the display via the user input device;

code that directs the processor to automatically create an outbound e-mail message in response to the selection of the user-selectable icon, the outbound e-mail having a pre-determined message, and the outbound e-mail message addressed responsive to the Internet e-mail message; and code that directs the processor to automatically send the outbound e-mail message to the e-mail server via the Internet, after the outbound e-mail message has been created, wherein the codes reside on a tangible media.

19. The e-mail client program product of claim 18 wherein the predetermined message comprises a request to remove an e-mail address from an e-mail list.

20. The e-mail client program product of claim 18 further comprising:

code that directs the processor to note in a log file that an outbound e-mail message having the pre-determined message was automatically sent.

* * * * *